Figure 1:
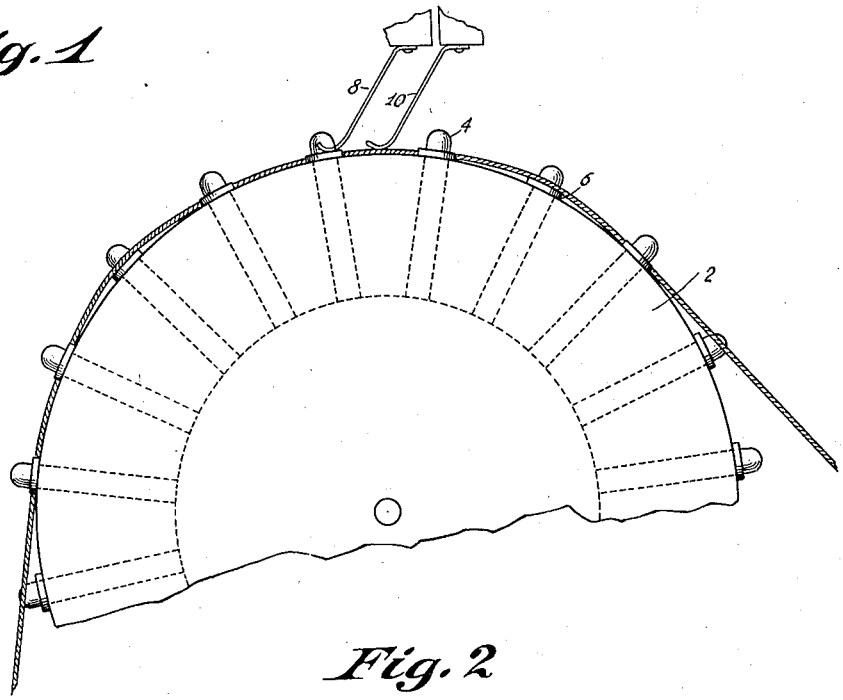

Sept. 8, 1931.     L. L. YOUNG     1,822,000
AUTOMATIC TAPE TRANSMITTER
Filed March 27, 1929     2 Sheets-Sheet 1

Inventor
LLOYD L. YOUNG
By his Attorney

Sept. 8, 1931.   L. L. YOUNG   1,822,000
AUTOMATIC TAPE TRANSMITTER
Filed March 27, 1929   2 Sheets-Sheet 2

INVENTOR
LLOYD L. YOUNG
BY
ATTORNEY

Patented Sept. 8, 1931

1,822,000

UNITED STATES PATENT OFFICE

LLOYD L. YOUNG, OF PORT JEFFERSON, NEW YORK, ASSIGNOR TO RADIO CORPORATION OF AMERICA, A CORPORATION OF DELAWARE

AUTOMATIC TAPE TRANSMITTER

Application filed March 27, 1929. Serial No. 350,422.

This invention relates to automatic tape transmitters, and more particularly to a method and means for increasing the speed of operation and the accuracy of such transmitters.

In the usual type of automatic tape transmitter the tape is perforated with a continuous row of uniformly spaced traction or center hole perforations, and in addition, two rows of signalling perforations which are synchronously related to the center hole perforations, so as to provide uniform timing of dots, dashes, and spacing, relative to a working unit of time equal to the spacing between successive center hole perforations.

In the usual machines reciprocable plungers cooperate with the signalling perforations, while a small star wheel pulls the tape by cooperation with the traction perforations. Only two pins on the star wheel engage the tape at any one time.

I have found that the perforating machine occasionally provides traction or center hole perforations which are not quite uniformly spaced, that is, a single perforation, now and then, may be slightly displaced. With the known types of machine this causes an irregularity in the timing of the transmitted signal, and to obviate such irregularities is one object of my invention, to fulfill which I pull the tape simultaneously by a considerable number of uniformly spaced traction pins. Structurally, this is most simply provided by using a pin wheel of great diameter, instead of a small star wheel.

In the tape transmitter a signalling contact is made in response to a reciprocation by a plunger through a signalling perforation. Some machines permit the plunger to move along with the tape very slightly, and many machines permit no movement at all. Consequently, when it is attempted to speed up the operation of the machine it is found that the plungers cannot enter and withdraw from the signalling perforations with sufficient speed, and they tear and mutilate the perforated tape. The primary object of my invention is to provide a tape transmitter capable of high speed operation, and to this end I permit the plungers to travel with the tape a distance equivalent to the time in which a relatively slow reciprocation transversely of the tape may take place. In one form, this implies the use of a considerable number of reciprocable plungers which move successively and simultaneously along with the tape.

I further improve the machine by making reciprocation necessary only occasionally, preferably only when contact is not to be made. Structurally, then, the invention may best be embodied by providing a cylinder of relatively large diameter provided with a circumferential row of traction or center hole pins and two circumferential rows of contacting plungers arranged to be reciprocable in a radial direction, the latter, upon entering signalling perforations in the tape contacting with two stationary brushes or wipers. The uniformity of the spacing of the traction pins and of the contacting plungers insures uniform timing of the signals, regardless of occasional slight irregularities in the spacing of the center hole perforations in the signalling tape.

Figure 2:
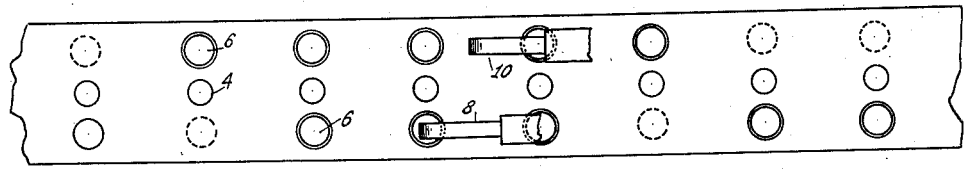
Figure 5:
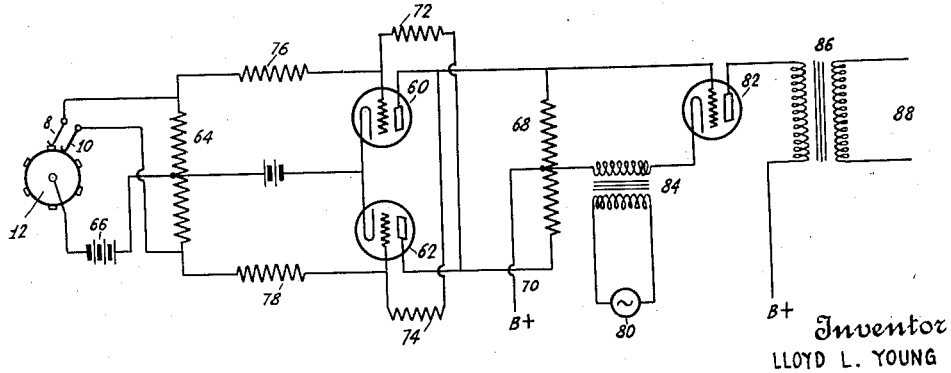
Figure 3:
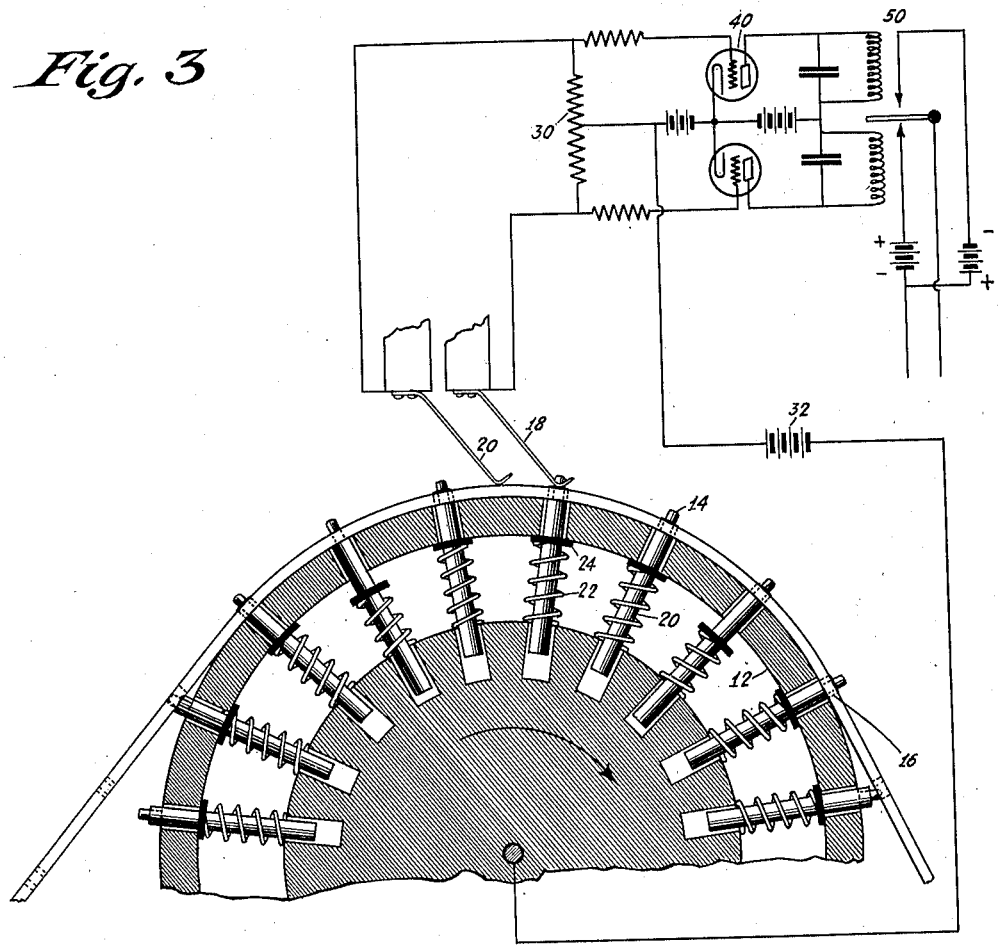
Figure 4:
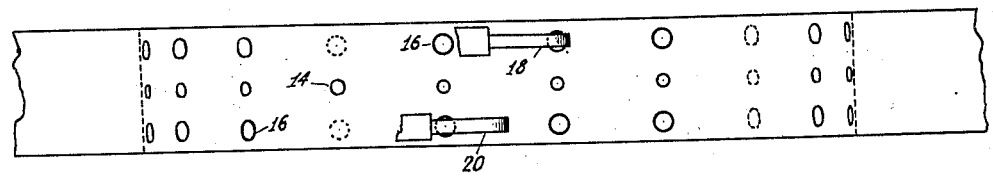

My invention is described further in the following specification, which is accompanied by drawings in which Figure 1 is an elevation of a simple form of my invention; Figure 2 is a plan view of the arrangement shown in Figure 1; Figure 3 is a preferred form of my invention employing reciprocable plungers; Figure 4 is a plan view of the arrangement shown in Figure 3; and Figure 5 is an alternative relay circuit.

Referring to Figure 1 it will be seen that there is a wheel 2, provided with traction or center hole pins 4, and contacting studs 6. It should first be noticed that the wheel 2 is so large in diameter that a considerable number of the traction pins 4 are engaged with the perforated tape at one time, so that slight irregularities in the spacing of an occasional perforation are averaged out. The contacting studs 6, in this case, are shown as rigid studs, which project from the surface of the wheel slightly more than the thickness of the signalling tape employed. Two rows of these studs are provided, one on either side of traction pins 4, and the studs cooperate with signalling perforations in the tape whenever such perforations are encountered. Contact is made with the studs by brushes or wipers 8 and 10. These are arranged yieldably, so that when no perforation exists in the tape the wiper rides over the extra thickness of the tape interposed between the stud and the wiper.

Referring to Figure 2 it will be seen that the row of traction or center hole pins 4 is disposed between two rows of contacting studs 6, and that the brushes 8 and 10 are staggered, so that a pair of signalling perforations on either side of a center hole will provide a signalling dot, the time duration being represented by the relative displacement of the brushes 8 and 10. This displacement ordinarily is half of the distance between successive center holes.

Attention is now directed to Figure 3, showing a preferred form of my invention, in which reciprocable plungers or contacting studs, instead of stationary studs, are employed. Referring to this figure it will be seen that there is a wheel or cylinder 12, to which are affixed a row of center hole pins 14. There also are two rows of reciprocable plungers 20, each carrying at its end a contacting stud 16. Light springs 22 tend to urge the plungers radially outward, so that they will enter the signalling perforations in the tape. Actually they project ahead of time, and enter the perforations by rolling into them, but are retracted when no perforation appears. The collars 24 prevent movement further than very slightly more than the thickness of the tape. It should be noticed that these plungers, instead of having to reciprocate into and out of a signalling perforation of the tape during the passage of such a perforation past a fixed point, have, in the case illustrated, about eight signalling periods in which to make a single reciprocation. Furthermore, it should be noticed that the plungers do not have to move at all, when a series of dots are being transmitted, but need only reciprocate when either a dash or a space is to be sent.

Contact with the studs 16 is made by the brushes or wipers 18 and 20, which, as before, are staggered to provide a timing impulse when using the usual type of perforated tape, which is perforated with a signalling perforation exactly at either side of a center hole when a dot is to be transmitted.

Figure 4 is a plan view of the arrangement shown in Figure 3, and, like Figure 2, indicates how the traction pins 14 are situated between rows of contacting studs 16, while the brushes 18 and 20 are staggered.

The brushes are arranged for instantaneous contact, if they are connected to an unstable relay, that is, one intended to be kicked over to one side or the other and there held, or, if a floating relay is employed, the brushes may be provided with a long wiping surface so as to contact during the desired time. The former arrangement is preferable, and has been indicated in the drawing. When the brushes contact with the studs a source of potential 32 is connected by leads from the brushes to the input resistance 30 of a push-pull vacuum tube stage 40, in the output circuit of which an unstable differential relay 50 is provided, when controls a source of signalling energy, in this case plus and minus direct current, which is to be fed over a land line to a remote radio transmitter.

For exceedingly high transmission speeds it may be desirable to avoid the use of a mechanical relay, such as is shown in Figure 3, and to use electron emission tubes exclusively. A wiring diagram for such an arrangement, combined with my machine transmitter, is illustrated in Figure 5. Referring to this figure it will be seen that there are a pair of electron emission tubes 60 and 62, to the control electrodes of which there is connected an input resistance 64. The terminals of the resistance 64 are connected to the staggered brushes 18 and 20, while the mid point of the resistance 64 is connected to a battery 66, and then to the contactor wheel 12. The anodes of the tubes are connected to an output resistance 68, the anode potential being supplied through a lead 70 connected to the mid point of the resistance 68. To make the circuit unstable each anode is connected to the control electrode of the other of the tubes, so that when a signal impulse from the battery 66 causes a change in the anode current and therefore anode potential of one of the tubes, this change is immediately augmented by the consequent changes in the control electrode and anode potentials of the other of the tubes. In consequence the tubes are held at the unequal bias until another impulse is received from the battery 66 in the opposite direction, that is, by the other brush, which throws the bias in the opposite direction, where it then is held. Resistances 72 and 74 are provided to prevent the control electrodes from becoming too positive, while resistances 76 and 78 serve to steady the operation of the circuit. Briefly stated, the cross connected resistances 72 and 74 make the push-pull circuit unstable, and when the bias impulses from the tape transmitter throw the circuit from one extreme bias to the other, the circuit holds itself in that extreme bias until thrown back. The operation is analogous to that of the unstable relay 50 in Figure 3, but no mechanically moving parts are employed.

For the sake of illustration this circuit controls a tone signal instead of plus and minus direct currents. Tone signal energy is obtained from a tone generator 80, which is coupled to the input circuit of a tube 82 by means of a transformer 84. The tube 82 is biased by the potential across one half of the resistance 68, so that when the tube 62 is conductive, and the tube 60 is not, the tube 82 is biased positively, and transfers energy from the tone generator 80 to a land line 88 through a transformer 86. On the other hand, when the tube 60 is conductive, the tube 82 is biased negatively to cut off, so that no energy from the tone generator 80 reaches the line 88.

It will be understood that by appropriate changes in the circuits the relay circuit shown in Figure 3 may be used to control a tone, while the tube circuit shown in Figure 5 may be used to control direct current energy. The automatic tape transmitter may be used for line telegraphy, instead of for remote control of a radio transmitter, by using a telegraph receiver at the remote end of the line, instead of a radio transmitter.

I claim:

1. A high speed tape transmitter comprising means to move a perforated tape, a plurality of reciprocable plungers for making electrical contact by passing through signalling perforations in the tape carried by said tape moving means, and means to permit the plungers to move with the tape a distance equivalent to the time in which a relatively slow reciprocation of the plungers may take place.

2. A tape transmitter comprising a pin wheel for pulling a tape having center holes, and signalling means carried by the wheel adapted to operate in response to signalling perforations synchronously related to the center holes, said pin wheel being so great in diameter that a considerable number of pins simultaneously pull the tape, in order to provide uniform signal timing in spite of occasional non-uniform spacing of the center holes.

3. A tape transmitter comprising means to move a perforated tape, a considerable number of reciprocable plungers for passing through perforations in the tape in order to provide signalling impulses, and means to move said plungers successively and simultaneously along with the tape in order to lengthen the time of reciprocation of the plungers relative to the signalling speed.

4. A tape transmitter comprising a cylinder provided with a circumferential row of traction pins and two circumferential rows of contacting studs, and a pair of contacting means arranged to cooperate with the studs when said studs are disposed in perforations in the signalling tape, said cylinder being so great in diameter that a considerable number of traction pins and contacting studs cooperate simultaneously with the perforated tape.

5. A tape transmitter comprising a relatively large diameter cylinder provided with a circumferential row of traction pins and two circumferential rows of contacting plungers arranged to be reciprocable in a radial direction, and two stationary contacting means cooperating with the plungers when the latter are disposed in the signalling perforations of a signalling tape.

6. A tape transmitter comprising a relatively large diameter cylinder provided with a circumferential row of traction pins and two circumferential rows of contacting plungers arranged to be reciprocable in a radial direction, stationary contacting means for contacting with each of the rows of contacting plungers when the latter are disposed in the signalling perforations of a signalling tape, an unstable relay circuit for relaying the signals to be transmitted, a source of potential, and means for causing said source of potential to influence the relay circuit in one direction or the other, according to whether contact is made with one or the other of the stationary contacting means by the contacting plungers.

7. A tape transmitter comprising a relatively large diameter cylinder provided with a circumferential row of traction pins and two circumferential rows of contacting plungers arranged to be reciprocable in a radial direction, stationary contacting means for contacting with each of the rows of contacting plungers when the latter are disposed in the signalling perforations of a signalling tape, said contacting means being relatively staggered a distance equal to half the distance between successive contacting plungers, an unstable relay circuit for relaying the signals to be transmitted, a source of potential, and means for causing said source of potential to influence the relay circuit in one direction or the other, according to whether contact is made with one or the other of the stationary contacting means by the contacting plungers.

8. A tape transmitter comprising a cylinder provided with circumferential traction means and circumferential contacting means, and stationary means for contacting with said circumferential contacting means, said stationary contacting means being staggered relative to the axis of the cylinder.

9. A tape transmitter comprising a cylinder provided with a circumferential row of traction pins and circumferential rows of contacting plungers arranged to be reciprocable in a radial direction, and stationary contacting means staggered relative to the axis of the cylinder for contacting with each of the rows of contacting plungers.

10. A tape transmitter comprising a relatively large diameter cylinder provided with a circumferential row of traction pins and two circumferential rows of contacting plungers arranged to be reciprocable in a radial direction, and stationary contacting means for contacting with each of the rows of contacting plungers when the latter are disposed in the signaling perforations of signaling tape, said contacting means being relatively staggered a distance equal to half the distance between successive contacting plungers.

LLOYD L. YOUNG.